March 25, 1952 W. H. PETIT 2,590,203
GEAR TESTING AND FINISHING MACHINE
Filed Sept. 15, 1950 5 Sheets-Sheet 1

INVENTOR.
WILLIAM H. PETIT
BY
ATTORNEY

March 25, 1952 W. H. PETIT 2,590,203
GEAR TESTING AND FINISHING MACHINE
Filed Sept. 15, 1950 5 Sheets-Sheet 2
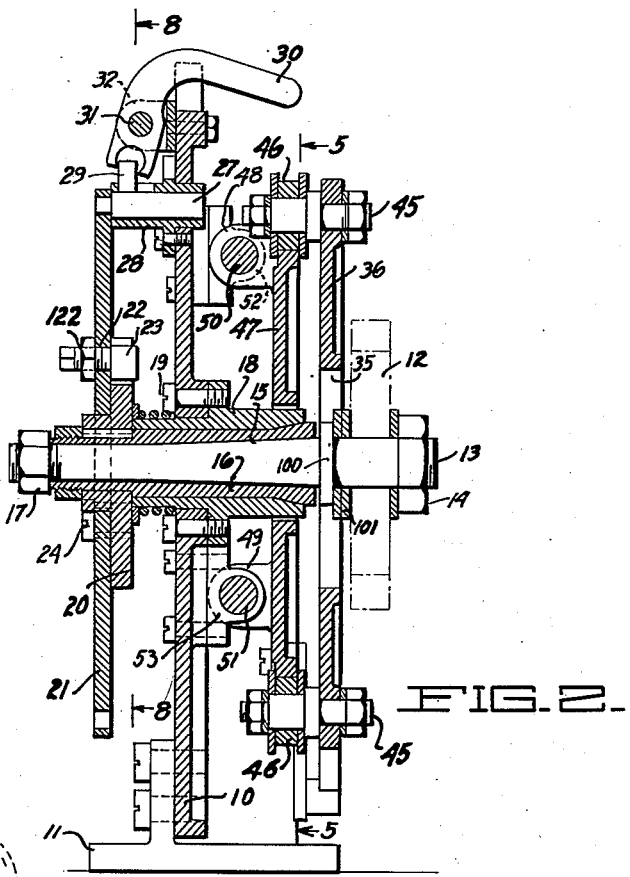
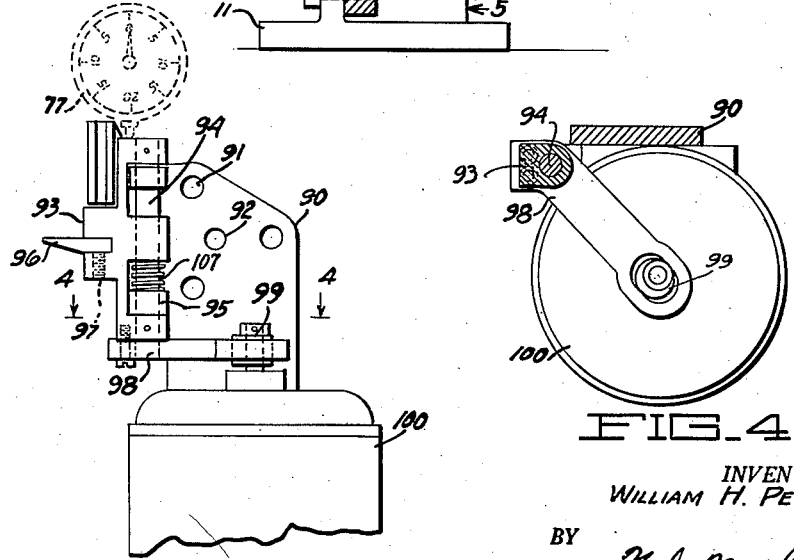
INVENTOR.
WILLIAM H. PETIT
BY
Fred N. Schwand
ATTORNEY March 25, 1952 W. H. PETIT 2,590,203
GEAR TESTING AND FINISHING MACHINE
Filed Sept. 15, 1950 5 Sheets-Sheet 3
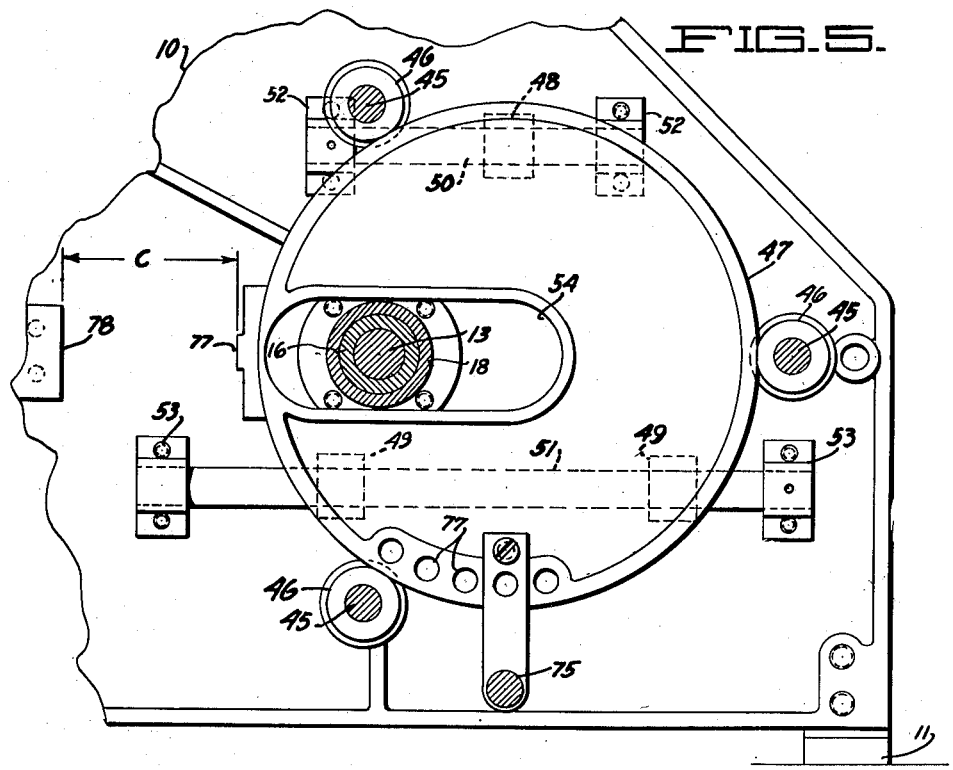
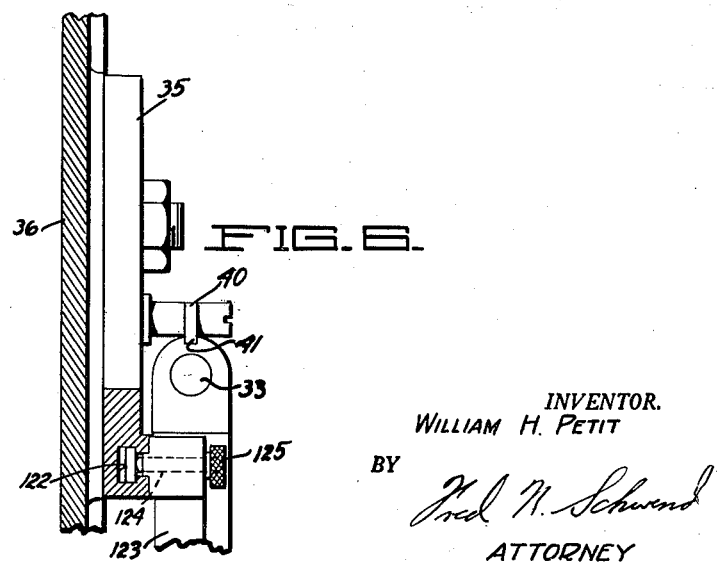
INVENTOR.
WILLIAM H. PETIT
BY
Fred N. Schwend
ATTORNEY March 25, 1952  W. H. PETIT  2,590,203
GEAR TESTING AND FINISHING MACHINE
Filed Sept. 15, 1950  5 Sheets-Sheet 4

INVENTOR.
WILLIAM H. PETIT
BY
*Fred N. Schwend*
ATTORNEY

March 25, 1952 W. H. PETIT 2,590,203
GEAR TESTING AND FINISHING MACHINE
Filed Sept. 15, 1950 5 Sheets-Sheet 5

INVENTOR.
WILLIAM H. PETIT
BY
ATTORNEY

Patented Mar. 25, 1952

2,590,203

UNITED STATES PATENT OFFICE 2,590,203

GEAR TESTING AND FINISHING MACHINE

William H. Petit, Pasadena, Calif.

Application September 15, 1950, Serial No. 185,040

6 Claims. (Cl. 51—58)

This invention relates to profile testing and generating machines and has particular reference to machines for testing and/or generating the tooth profiles of gears.

One of the objects of the present invention is to provide a gear machine which will quickly and accurately check all parts of the working profiles or working surfaces of gear teeth.

Another object is to provide a gear machine which is simple in construction and which may be quickly and readily set to check or finish gear teeth of different types, sizes, etc.

A further object is to utilize the same machine for both finishing gear teeth profiles and testing the same.

A further object is to form gear tooth faces having superior lubrication retaining characteristics.

Heretofore, various gear generating and checking machines have been developed and used. Although such machines in general have been satisfactory they have been limited in accuracy, leaving minute irregularities or deviations from a true gear tooth profile. Because of this limitation, spur gears heretofore produced by such machines have either been limited in speed or, when driven at high rates of speed, have produced considerable noise and, consequently, excessive wear. For this reason other forms of gears such as helical, herringbone, etc. have been developed for high speed operation or for instances where gear noise and wear would otherwise be objectionable. Although such gears are quieter than spur gears as heretofore produced by previous gear generating, milling, etc. machines, they are more expensive to produce and are less efficient, particularly in view of the lateral component of thrust and power consumption which they develop.

The patent to J. H. Barnes No. 2,446,865, issued on August 8, 1948, discloses and claims a machine which is capable of generating accurate gears of the spur and other types. Although this machine is generally satisfactory, the present invention is an improvement thereof in simplicity of operation, construction, ease of adjusting to suit different gears, and the provision whereby the machine can be used for both testing and finishing.

The manner in which the above and other objects of the invention are accomplished will be readily understood on reference to the following specification when read in conjunction to the accompanying drawings wherein:

Fig. 2 is a transverse sectional view taken along the line 2—2 of Fig. 1.

Fig. 3 is a front view, partly broken away, of a tooth generating or finishing head adapted to be mounted on the machine.

Fig. 4 is a sectional plan view taken along the line 4—4 of Fig. 3.

Fig. 5 is a sectional elevation view, partly broken away, of the machine and is taken along the line 5—5 of Fig. 2.

Fig. 6 is a fragmentary sectional plan view showing the measuring head and is taken along the line 6—6 of Fig. 1.

Figure 1:
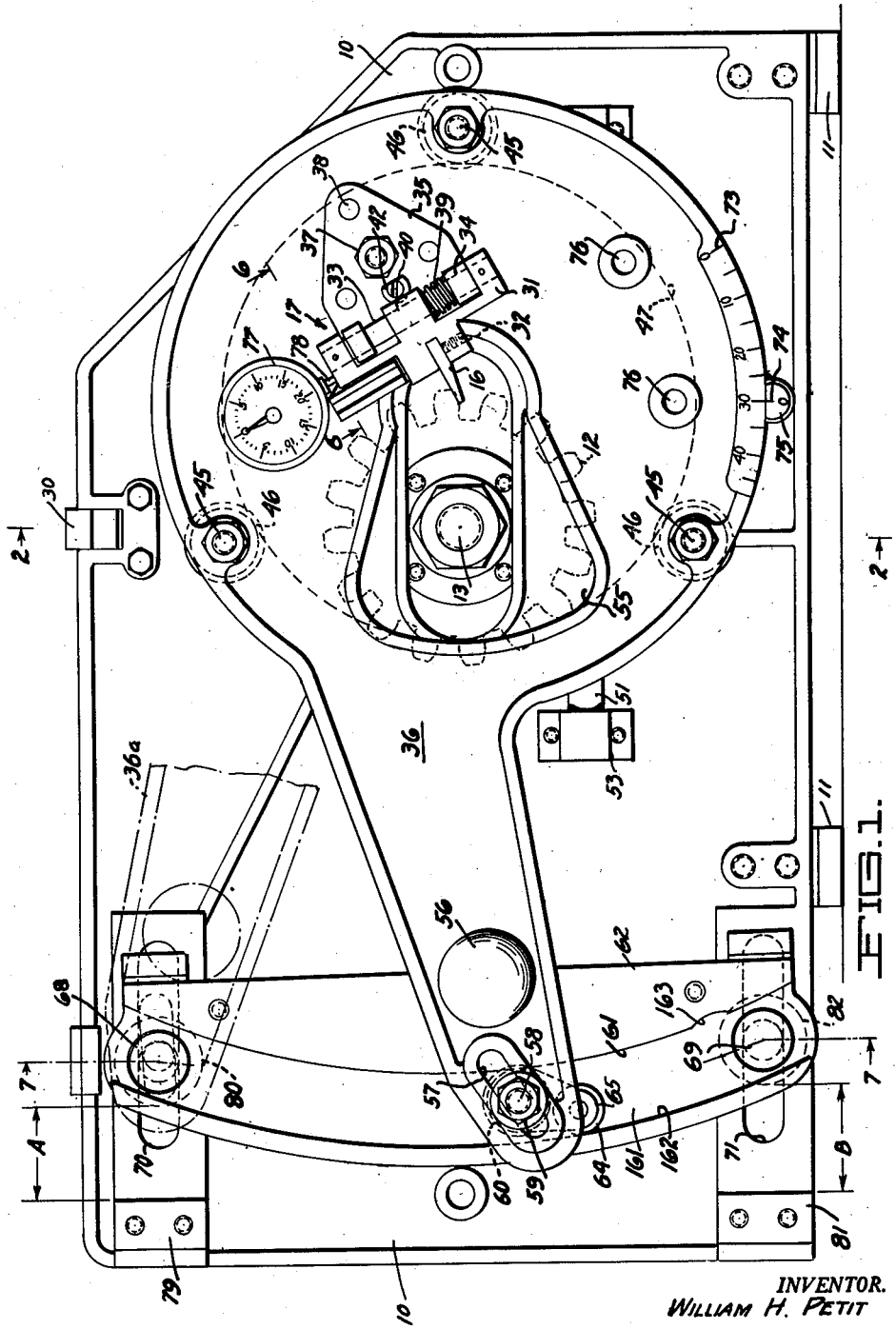
Fig. 1 is a front elevation of a machine embodying the present invention with instrumentalities shown thereon for checking tooth profiles.

Referring to Figs. 1 and 2, in particular, which show the machine set up for checking the teeth of a gear, the entire machine is mounted on a vertical frame 10 supported by spaced feet 11.

The gear, whose gear teeth are to be checked, is indicated by dot and dash lines 12, and during a checking operation the gear is held stationary while the anvil 16 of a measuring head generally indicated at 17 is carried over the surface of one of the teeth of the gear as will appear later. The measuring head is moved along a theoretically true tooth profile curve and any inaccuracies or departures in the tooth surface from a theoretically accurate gear tooth profile will be noted by an indicator 77 as the anvil moves along the gear tooth surface. After checking the profile of one of the gear teeth, the gear is indexed about its axis to register the next succeeding gear tooth in position to be checked.

Describing now the means for supporting and indexing the gear, the latter is mounted on an arbor 13 and is secured thereto by means of a nut 14 threaded on the outer end of the arbor, clamping the same against a shoulder 100 and several spacer rings 101. The arbor has a tapered portion 15 thereon fitting within a like portion of a quill 16 and removably secured thereto by a nut 17 threaded on the opposite end of the arbor. This arrangement permits arbors having different gear supporting diameters to accommodate the holes of different gears to readily mount the same in place.

The quill 16 is journaled in a bearing 18, which is secured to the frame 10 by bolts 19, and is securely keyed to a notched flange 20.

An indexing plate 21 is loosely mounted on the hub of the flange 20 and has secured thereto a bolt 22, having an eccentric head 23 fitted in a radial notch formed in flange 20. The bolt 22 is adjustable to different angular positions and may be locked in any position by a nut 122 whereby the angular relation between the plate 21 and the gear 12 may be readily changed a small amount as desired. After any necessary rotational adjustment of the plate 21, it is secured to the flange by bolts 24 extending through enlarged openings 25 in the plate and threaded into the flange 20.

Plate 21 has a series of equally spaced holes 26 therein adapted to be engaged by a pin 27 slidably mounted in a bearing 28 which is suitably secured to the frame 10, so as to index the plate, and consequently the gear 12, in different positions so as to present the different gear teeth in position to be checked. Obviously, a number of indexing plates would be provided, and one having a number of holes equal to the number of teeth of the gear to be checked or an even multiple thereof would be selected and attached to the flange 20.

The indexing pin 27 has a stud 29 extending therefrom and engaged by the bifurcated end of a setting handle 30 pivoted at 31 to a bracket 32 secured to the machine frame 10 whereby the indexing pin may be moved into and out of engagement with the holes in the index plate 21 to locate the plate in different positions.

Describing now the means for moving the measuring anvil 16 over the surface of a gear tooth face, the anvil is fitted in a slot formed in a holder 31 and is removably secured therein by a stud screw 32. The holder carries between spaced arms thereof a slide rod 33 slidably mounted in bearings 34 extending from a base 35. The base is removably secured to a generating arm or device 36 by a bolt and nut 37 and is accurately held in position thereon by dowel pins 38. The anvil holder 31 and its slide rod 33 are permitted a small amount of lengthwise movement along the bearings 34 and a compression spring 39 extends between the lower bearing 34 and a part of the holder to urge the holder upwardly toward an upper limiting position shown in Fig. 1. Normally, the holder 31 is retained from swinging about the axis of rod 33 by the head of a guide screw 40 threadably secured in the base 35 and having the head thereof extending into a slot 41 in the holder (see also Fig. 6). However, by rotating the screw until a flat portion 42 of the head thereof is aligned with the groove 41, the anvil holder may be swung outward to permit rotation of the gear 12 to a new position.

The generating arm 36 has three equally spaced bearing studs 45 thereon which rotatably support flanged rollers 46 (see also Figs. 2 and 5). The latter roll over the periphery of a circular pivot disc 47 having integral therewith an upper horizontally extending bearing 48 (Fig. 5) and two lower bearings 49, said bearings being slidable along rods 50 and 51 secured between pairs of brackets 52 and 53 which are suitably secured to the machine frame 10. The disc 47 is provided with an elongated opening 54 encompassing and out of engagement with the bearing 18 whereby the disc may be freely moved fore and aft an appreciable amount. Likewise, the generating arm 36 is provided with a generally triangular opening 55 encompassing and out of engagement with the arbor 13 in all positions thereof to permit the same to be moved fore and aft with the disc 47 and also angularly thereabout relatively to the arbor.

Figure 7:
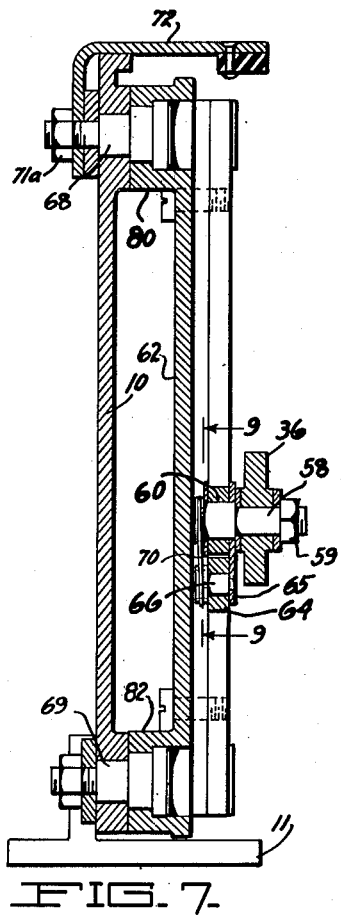
Fig. 7 is a transverse sectional view taken substantially along the line 7—7 of Fig. 1.
Figure 8:
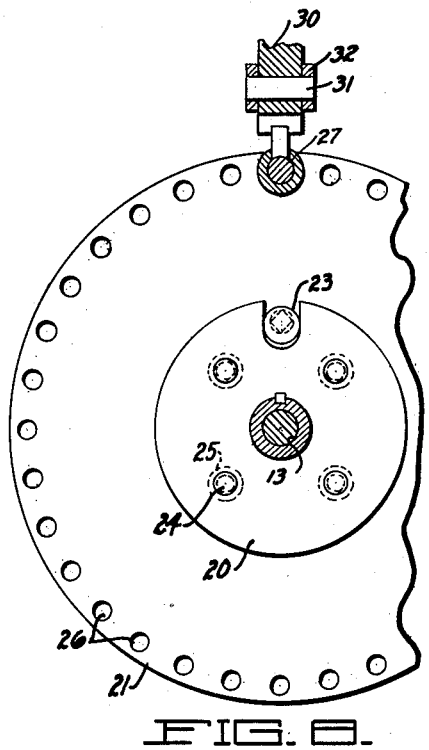
Fig. 8 is a sectional view taken along the line 8—8 of Fig. 2 showing the indexing device.

The arm 36 has a forward extension on which is secured a knob 56 permitting manual manipulation of the arm to effect the tooth profile checking operation. A slot 57 is also formed in the extension of the arm 36 and has a stud 58 (Fig. 7) extending therethrough and adjustably secured in any of several positions therealong by a nut 59. A roller 60 is journaled on stud 58 and is arranged to ride on the rear surface 61 of a cam way 161 formed in a cam block 62, the roller being slightly smaller in diameter than the width of the cam way. The cam block is arranged to be secured in different positions on the frame 10 as will appear presently, and has a forward arcuate surface 162 concentric with the cam surface 61.

Figure 9:
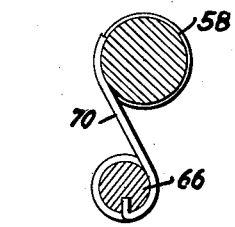
Fig. 9 is a sectional view taken along the line 9—9 of Fig. 7.

A second roller 64 is mounted on a pin 66 carried by an arm 65 hinged on the stud 58, and a torsion spring 70 (see also Fig. 9) is wrapped around the stud 58. The spring is attached to pin 66 whereby to maintain the roller 64 in engagement with the cam way 63 so as to insure rolling contact of roller 60 with cam way surface 61 at all times during operation of the machine.

The cam block 62 is adjustable into different positions on the machine frame 10 in order to guide the generating arm in different paths of movement as required by the size and shape of the gear teeth being tested, and for this purpose the block is provided with bolts 68 and 69 (Figs. 1 and 7) extending therethrough at its upper and lower extremities. The bolts also extend through elongated slots 70 and 71 in the frame 10 and are adapted to be secured in their adjusted positions by nuts 71a. A guard 72 is mounted on the upper bolt 68 and extends above the cam way to limit upward movement of the arm 36.

It is desirable during adjustment of the cam block 62, and at other times, to set the generating arm in different angular positions, and for this purpose the arm is provided with a scale 73 movable in relation to an index point 74 carried on a bracket 75 (see also Fig. 5) which is suitably secured to the pivot disc 47.

In order to lock the arm in different angular positions a pair of holes 76 are provided therein, adapted to register with a series of holes 77 formed in the disc 47 whereby a dowel pin (which is not shown) can be extended coextensively through selected holes in the arm and in the disc 47 to lock the arm in the desired setting.

For checking and measuring purposes, a dial indicator 77 of conventional construction is suitably secured to the generating arm 36 (in a manner not shown) and has its measuring anvil 78 arranged to engage the top surface of the holder 31 whereby to indicate the extent of movement of the holder relative to the arm 36 in a direction parallel to the slide rod 33.

In setting up the device for checking and measuring the teeth of a gear, the generating arm 36 is preferably first angularly adjusted to its zero position indicated by the scale 73 in which position the top surface of the measuring anvil 16 is precisely parallel to a line extending between the center of oscillation of the generating arm and the center of the gear to be tested. In this position of the arm, as indicated by the dot-dash lines 36a of Fig. 1, the roller 60 will be located substantially coextensive with the bolt 68 to facilitate adjustment of the cam block. Also, when in this position the slot 57 in the extension of arm 36 will extend parallel and in alignment with slot 70 to further facilitate adjustment of the parts.

In order to prepare the machine for operation it is necessary to ascertain the number of teeth and base radius of the gear to be tested. The base radius is equal to the pitch radius multiplied by the cosine of the pressure angle.

Figure 13:
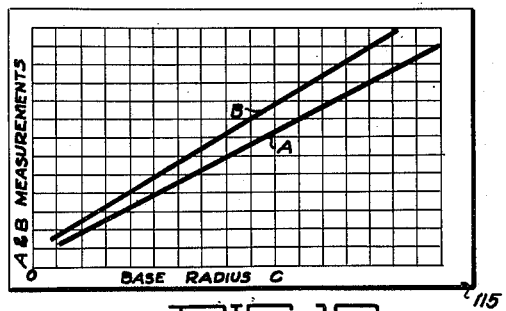
Fig. 13 illustrates a graphic chart prepared to determine the various basic settings of the machine for different gear sizes.

On a chart 115 (Fig. 13) are provided lines A and B whose intersections with vertical lines (base radius values) are representative of the setting dimensions A and B (Fig. 1) and are indicated on the vertical scale on the left hand margin. The setting dimension C is equal to the base radius of the gear.

With the clamp nut 59 on stud 58, and the clamp nuts 71a on studs 68 and 69 loosened, the cam block 62 is positioned with gauge blocks or other suitable measuring instruments held in place between a pad 79 integral with frame 10 and an upper hub 80 on the cam block surrounding bolt 68 for the A measurement, and between a second pad 81 on frame 10 and a lower hub 82 on the cam block for the B measurement. The nuts 71 are then tightened so as to maintain the measurements required. The measurement C is then set between a pad 78 (Fig. 5) on frame 10 and a pad 77 on disc 47. Clamp nut 59 is then tightened on stud 58 with the roller 60 in contact with cam face 61.

Also, the gear 12 is rotatably adjusted by means of the eccentric head bolt 22 (Fig. 2) so that the intersection of the tooth profile being tested and the base circle lie substantially at the center of rotation of the arm 36, care being taken that the anvil 16 and its holder will be permitted movement in either direction from this position to actuate the indicator 77 when any irregularities are met, thereby readying the machine for operation.

During the checking and measuring operation, the knob 56 is grasped by the operator to move the generating arm 36 along the cam way of cam block 62, and during this operation the measuring anvil 16 will move along the face or profile of an indexed tooth of the gear 12. Any irregularities from a theoretical profile will be immediately indicated by the indicator 77. The knob may be aided or replaced by a suitable power drive or suitable gearing (not shown) to effect an oscillating movement of the generating arm.

Figure 10:
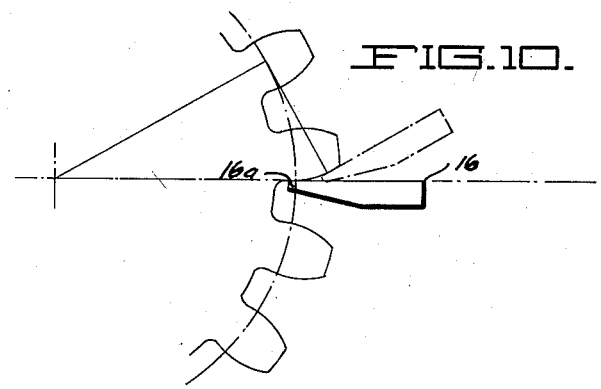
Fig. 10 is a diagrammatic view showing the positioning of the measuring anvil or other tool at different times during a gear checking or generating operation.

The interaction between the measuring anvil 16 and the tooth profile during the testing operation will be more readily understood upon reference to Fig. 10 in which the anvil is shown in full lines corresponding to a zero degree setting of the generating arm. It will be noted that in this position of the arm, the anvil extends coincident with the base line passing through the center of the gear 12 and the center of oscillation of the generating arm. Also, the tip 16a of the anvil extends slightly beyond the base circle or point of origin of the involute curve formation of the tooth profile. Thus, the point of tangency of the anvil and the tooth profile at zero degree position of the arm lies at the intersection of the base circle and the tooth.

As the generating arm moves radially and angularly relative to the gear, the point of contact between the anvil and the gear tooth moves outward toward the tip of the tooth, and at all times the tip 16a of the anvil will be located inwardly of the point of contact so that a tangential relationship exists between the anvil and the tooth at all times, and with a theoretically accurate gear tooth profile the successive points of contact will describe a true generated curve. Otherwise, the amount of deviation from this curve will be indicated by the indicator 77.

A slight depression or dip 163 is formed in the cam surface 61, permitting the cam follower roller 60, when rocked counter-clockwise to an extreme position, to move sufficiently to the right when viewed in Fig. 1 to carry the anvil 16 past the tip of one tooth of the gear being tested. Thus, the gear may be readily indexed from one tooth to another without interfering with the anvil.

A tool holder 93, similar in construction to the anvil holder 31, is provided with a slide rod 94 guided in bearings 95 integral with the base 90. A honing stone, file, or similar tool 96 is removably secured in a slot in the holder by a set screw 97 and the holder has secured thereto a slotted arm 98, the slot embracing an eccentric 99 carried by the armature shaft of a motor 100. The latter is suitably mounted on the base 90. Upon rotation of the motor the eccentric 99 will cause arm 98 and elements 93 and 96 to oscillate rapidly about the axis of shaft 94.

A compression spring 107 encircles the rod 94 between the lower bearing 95 and an extension of the holder 93. The tool 96 locates in the same position as the nominal setting of the checking anvil 16 and thus, when the generating arm 36 is oscillated, the tool will generate the tooth profile and will accordingly finish the gear to its final dimensions which may be ascertained by reference to the indicator 77 during operation.

Figure 12:
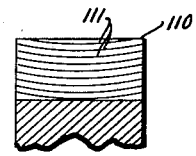
Fig. 12 is a fragmentary sectional view of a gear illustrating microscopic score lines or ridges formed by the finishing tool of the present machine.

Fig. 12 illustrates a spur gear tooth 110 which has been finished by the finishing head shown in Figs. 3 and 4. Due to the oscillatory movement of the honing or the like tool 96, arcuate microscopic ridges or grooves 111 are formed along the faces of each tooth of the gear. When two gears so finished are seen in contact with each other the microscopic ridges or grooves 111 coact in that the ridges on the contacting faces of the teeth of the gears extend opposite to each other, to move a film of lubricating oil, grease or any other lubricating medium toward the centers of the teeth. This action tends to pocket the lubricating medium at these points, thereby reducing the tendency of the lubricating medium to be squeezed outward to the edges of the gear tooth faces.

Although it is generally desirable to oscillate the tool 96 during the honing or finishing process in order to obtain the aforesaid advantageous results, the honing process may, if desired, also be carried out without operating the motor 100 to oscillate the tool. In fact, the head 17 of Fig. 1 might be used, substituting a honing, filing, grinding or other tool for the anvil 16.

Figure 11:
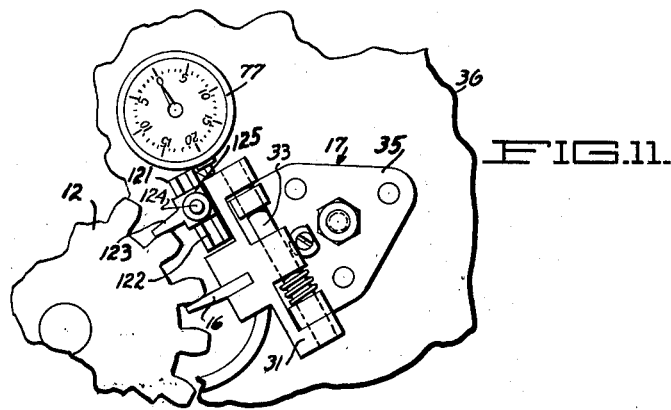
Fig. 11 is a fragmentary side view of the generating arm and checking instrumentalities arranged to check the spacing between gear teeth.

Fig. 11 fragmentarily illustrates the machine in condition for checking the spacing between adjacent teeth of the gear 12. In this case the gear tooth checking head 17 is attached to the generating arm 36. It will be noted that the base 35 of the checking head includes a projection 121 (see also Fig. 6) integral therewith and provided with a T slot 122 extending parallel to the rod 33. Incident to a check of a gear tooth spacing, a second anvil 123 having a bolt 124 extending therethrough is fixed on the projection 121 with the head of the bolt 124 fitted within the T slot. The anvil 123, having a tooth engaging surface thereof parallel to the tooth engaging surface of anvil 16 and perpendicular to the axis of the rod 33, is moved into contact with a gear tooth adjacent the tooth contacting the anvil 16 and is fastened in place in this position by a nut 125 threaded on the outer end of the bolt, care being taken that the holder 31 and anvil 16 are so placed in their nominal setting that they may move in either direction in order to actuate the indicator 77 when inaccuracies of spacing in either direction are encountered.

Although the machine of the present invention is described and illustrated as usual in connection with spur gears having their teeth extending parallel to the axis of rotation thereof, the machine is also capable of testing and finishing spur gears having teeth which are non-linear in length, such as those in which the teeth are barrel shaped. In fact, the machine can be used with obvious modifications to test and finish gears of types other than spur.

Having thus described the invention what I desire to secure by United States Letters Patent is:

1. A device for generating a gear tooth curve comprising a bearing device, means supporting said bearing device for rectilinear movement, a generating element pivotally supported by said bearing device, a generating tool, means on said generating element forming a slide bearing for supporting said tool and for constraining said tool to move with said generating element in a direction extending parallel to a plane tangent to said gear tooth curve, yieldable means on said generating element for moving said tool along said slide bearing, a cam stationary relative to said bearing device, and cam follower means on said generating element adapted to be guided by said cam.

2. A device for checking or finishing the contours of gear teeth comprising a pivot element, means for guiding said element along a rectilinear path, a generating device pivotally supported by said pivot element, a stationary cam for controlling movement of said generating device along said path upon pivotal movement of said generating device, a gear tooth engaging tool, means for supporting a gear in cooperative relation to said tool, means on said generating device supporting said tool for rectilinear movement relative thereto in a direction perpendicular to a plane tangent to a gear tooth engaged by said tool and for constraining said tool to move with said generating device in a direction parallel to a plane extending tangent to said gear tooth, and spring means for urging said tool into engagement with said gear tooth in said perpendicular direction.

3. A device for finishing the contours of gear teeth comprising a pivot element, means supporting said element for movement along a rectilinear path, a generating device pivotally supported by said pivot element, a stationary cam, cam follower means carried by said generating device and adapted to be guided over said cam whereby to control movement of said generating device along said rectilinear path during pivotal movement thereof, a gear tooth finishing tool, means for supporting a gear in cooperative relation to said tool, mechanism carried by said generating device for moving said tool transversely across the face of a tooth of said gear, and spring means for urging said tool in engagement with said gear tooth.

4. A device for finishing the contours of gear teeth comprising a pivot element, means supporting said element for movement along a rectilinear path, a generating device pivotally supported by said pivot element, a stationary cam, cam follower means carried by said generating device and adapted to be guided over said cam whereby to control movement of said generating device along said rectilinear path during pivotal movement thereof, a gear tooth finishing tool, means for supporting a gear in cooperative relation to said tool, and means for oscillating said tool about an axis extending perpendicular to a plane tangent to a gear tooth engaged by said tool.

5. A device for finishing the contours of gear teeth comprising a pivot element, means supporting said element for movement along a rectilinear path, a generating device pivotally supported by said pivot element, a stationary cam, cam follower means carried by said generating device and adapted to be guided over said cam whereby to control movement of said generating device along said rectilinear path during pivoted movement thereof, a gear tooth finishing tool, means for supporting a gear in cooperative relation to said tool, a sliding rocking bearing device carried by said generating device for supporting said tool for movement about an axis extending perpendicular to a plane tangent to a gear tooth engaged by said tool and for movement along said axis, means for moving said tool about said axis, and means for moving said tool along said axis into engagement with said gear tooth.

6. A device for finishing the contours of gear teeth comprising a gear tooth finishing tool, means for supporting a gear in cooperative relation to said tool, a tool supporting device, means on said tool supporting device for oscillating said tool about an axis extending perpendicular to a plane tangent to a gear tooth engaged by said tool, and means for moving said tool supporting device to cause said tool to follow the profile of said gear tooth.

WILLIAM H. PETIT.

REFERENCES CITED

The following references are of record in the file of this patent:

UNITED STATES PATENTS

| Number | Name | Date |
|---|---|---|
| 1,564,589 | Laessker | Dec. 8, 1925 |
| 2,171,589 | Miller | Sept. 5, 1939 |
| 2,353,861 | Wallace | July 18, 1944 |
| 2,389,549 | Ross | Nov. 20, 1945 |
| 2,423,286 | Barnes | July 1, 1947 |